United States Patent [19]
Edmondson

[11] Patent Number: 5,000,310
[45] Date of Patent: Mar. 19, 1991

[54] CHAIN AND FLIGHT CONVEYOR

[75] Inventor: Wayne L. Edmondson, Franklin, Pa.

[73] Assignee: Joy Technologies Inc., Pittsburgh, Pa.

[21] Appl. No.: 367,831

[22] Filed: Jun. 16, 1989

[51] Int. Cl.$^5$ ............................................. B65G 19/24
[52] U.S. Cl. ...................................... 198/731; 198/732
[58] Field of Search ............... 198/731, 732, 733, 712; 414/528

[56] References Cited

U.S. PATENT DOCUMENTS

| 620,371 | 2/1899 | Sheldrick | 198/731 |
|---|---|---|---|
| 991,433 | 5/1911 | Edison | 198/712 |
| 1,686,567 | 10/1928 | Levin | 198/732 |
| 1,795,982 | 3/1931 | Warner | 198/712 |
| 2,381,519 | 8/1945 | Russell | 198/732 |
| 2,954,864 | 10/1960 | Lee et al. | 198/731 |
| 3,091,325 | 5/1963 | Klemme | 198/731 |
| 3,171,533 | 3/1965 | Ferg | 198/731 |
| 4,747,481 | 5/1988 | Gorlov et al. | 198/732 |
| 4,787,400 | 11/1988 | Tanis | 198/731 |

FOREIGN PATENT DOCUMENTS

| 2105960 | 8/1972 | Fed. Rep. of Germany | 198/731 |
|---|---|---|---|
| 844771 | 8/1960 | United Kingdom | 198/731 |

Primary Examiner—Joseph E. Valenza
Attorney, Agent, or Firm—Kirkpatrick & Lockhart

[57] ABSTRACT

Apparatus for attaching conveyor chains and flights utilized in shuttle cars are disclosed. The flight attachment design includes an attachment link with male members extending from the roller links to which the flights are to be attached. The roller links have slots which allow the engagement of each of the roller links by the drive sprockets. A specially designed flight has female ends which are positioned around the male extensions of the roller links. Retaining pins inserted in cooperating holes secure each of the flights to the male members of the roller links. The roller links of each conveyor chain are connected by side plates and pins positioned on each side of the roller link such that a slot remains between the roller links which may be engaged by the drive sprockets.

2 Claims, 3 Drawing Sheets

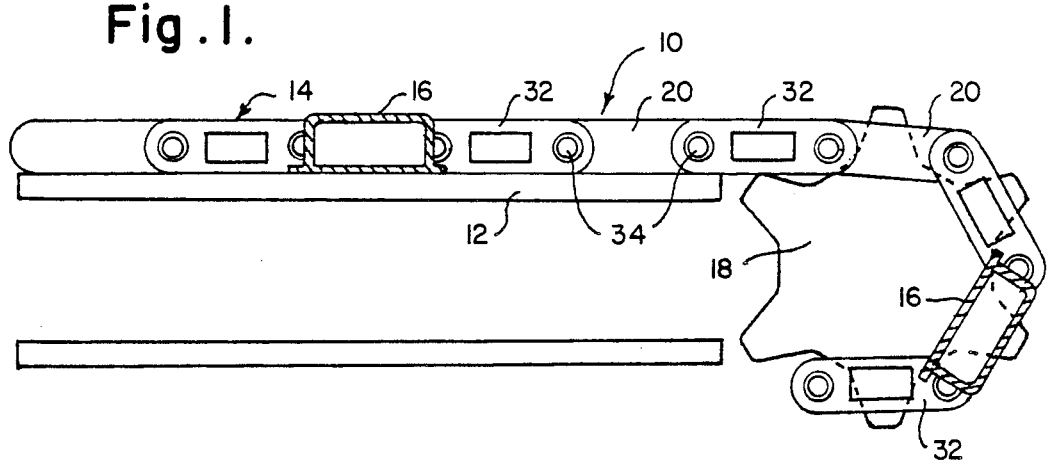
Fig. 1.
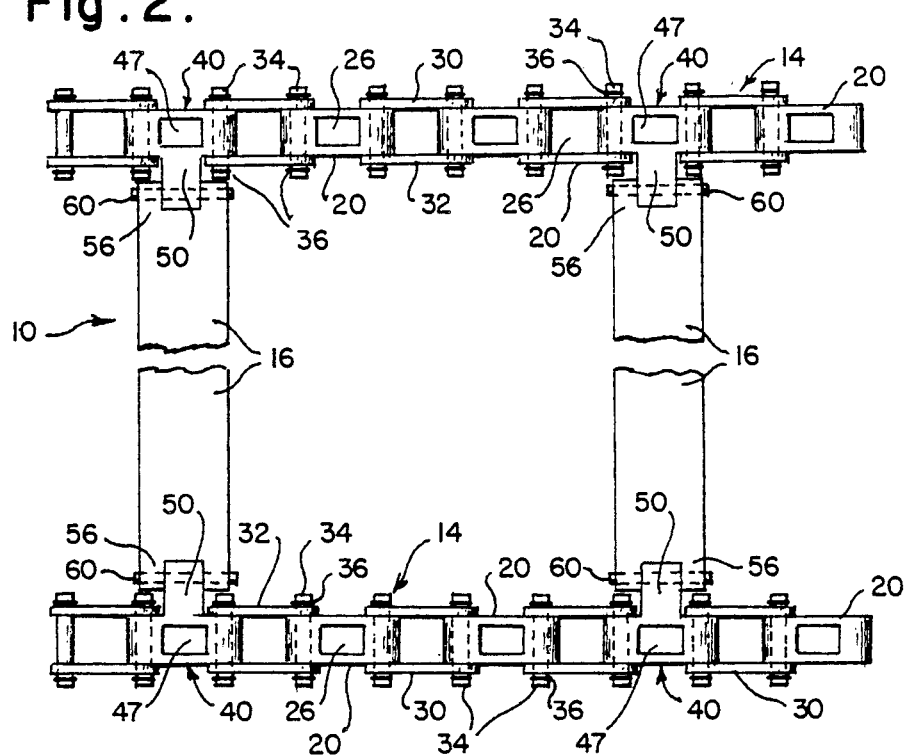
Fig. 2.
Fig. 3.
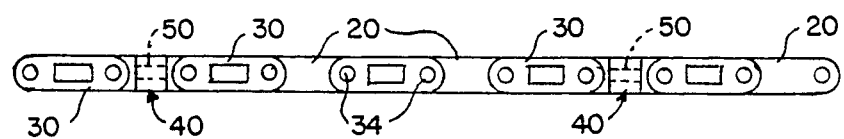

CHAIN AND FLIGHT CONVEYOR

BACKGROUND OF THE INVENTION

1. Field of the Invention

The present invention relates to a chain and flight conveyor for use in conveying materials in the mining industry, and, in particular, to an improved design for the attachment of flights to conveyor chains.

2. Description of the Prior Art

In the process of underground mining, material is removed from a seam and transferred between machines which employ conveyors. Mined material is often transported and conveyed in shuttle cars which have a flat deck and conveyor chains which are designed specifically to load and unload the material therefrom. In most applications, the conveyor chains in the shuttle cars consist of two drive chains which are positioned on the extreme outer borders of the conveying decks of the cars. The drive chains consist of roller links, which contact the drive sprockets of the machine, and connecting links which are positioned between the roller links. In addition, the conveyor chains have flights which are fixed to the two drive chains and are positioned between the two chains. These flights are usually made of steel and can be a welded, tubular design or a solid, one piece design. The conveyor chain flights are positioned along the drive chains in a spacing designed to efficiently move material in the shuttle car. The flights are usually connected to the drive chains by inserting a male member on the ends of the flights through slots which are located in the roller links of the drive chains.

The prior designs have had disadvantages in several respects. In most previous designs, attachment and removal of the flights from the conveyor chains has been difficult, many times necessitating removal of the chain links to replace a flight. The drive chains in most prior designs must be moved from their normal operating position on the sprockets in order to connect the flights to the chains. In addition, forces experienced during the operation of a shuttle car which destroy the flights are transferred to the drive chains and often cause failures of those chains.

One prior art conveyor chain design appears in French Patent No. 665,420 issued to Naranovitch. That patent teaches of a conveyor chain in which the links include individual wheels. Certain links are designed differently and have a male extension fitting into a vertical U-shaped hinge element on the end of the flight. The attachment is secured by a pin. This patent, however, does not relate to a roller link arrangement which is driven by a drive gear. Also, the pins interconnecting the flights and the modified links are subjected to pure shear forces. Another design for a conveyor chain appears in U.S. Pat. No. 2,575,610 issued to Ball. That patent discloses parallel chains having flights with a male projection member thereof fitting into openings in predetermined chain links. This projection is slightly smaller than the opening thereby allowing for a small degree of tilt. Thus, the flight is pivotally connected to the side chains and replacement of flights requires that the chain be removed from the drive sprockets to remove a flight. Yet another design appears in U.S. Pat. No. 3,089,579 issued to Beck. The Beck patent teaches a conveyor flight with a removable, outwardly projecting male extension member which fits into openings in certain links on the chain. This extension is fastened to the flight by means of an interlocking tongue and groove mechanism fastened by bolts. As such, the flight may be removed from or attached to the conveyor chain without disturbing the chain tension or removing the entire load. However, in this apparatus the male extension member enters the conveyor chain and prohibits engagement of the conveyor drive sprocket with predetermined links along the chain.

The subject invention is directed toward an improved design for attachment of flights to a chain and flight conveyor which overcomes, among others, the above discussed problems and which provides for a more useful means of flight attachment which does not require a disruption of the conveyor chain for flight replacement and which allows all roller links to be engaged by the conveyor chain drive gears of the shuttle car. This new design enables attachment of the flights to the drive chains without repositioning the drive chains from their normal operating position. In addition, the component parts are designed so that, if a flight fails, the drive chains will not fail.

SUMMARY OF THE INVENTION

In accordance with the present invention, there is provided an improved design for a chain and flight conveyor. Two drive chains are positioned on the perimeter of a flat horizontal deck of a shuttle car used in mining operations. Flights run between the chains and sweep material along the deck. The flights are usually made of steel and can be a welded, tubular design or a solid, one piece design.

Each chain includes flight attachment roller links, or block links, certain of which are provided with male members which extend inwardly toward the other chain and to which the flights are to be attached. Each roller link has a slot allowing engagement of the roller link by the drive sprockets for the drive chain. A specially designed flight has female ends which are positioned around the male extensions of the flight attachment links. Retaining pins inserted in cooperating holes in the flights and flight attachment links secure each of the flights to the male members of the flight attachment links. The remaining roller links of each drive chain are connected by side plates and journal pins positioned on each roller link such that a slot remains between the roller links which may be engaged by the drive gears.

Accordingly, the present invention provides solutions to the aforementioned problems encountered in the utilization of chain and flight conveyors in shuttle cars. As this invention provides flight attachment links with extended male members to which the flights are attached, the problems caused by the necessity to remove or disrupt the conveyor chains to replace or repair flights are alleviated. In addition, as the present invention includes slots in the flight attachment links which may be engaged by the sprockets which drive the drive chains, the drive chains may be engaged at each roller link thereby providing smoother, more efficient operation thereof.

These and other details, objects, and advantages of the invention will become apparent as the following description of the preferred embodiment thereof proceeds.

BRIEF DESCRIPTION OF THE DRAWINGS

In the accompanying drawings, I have shown a present preferred embodiment of the invention wherein:

FIG. 1 is a side view with partial cut away of a shuttle car conveyor chain with flights and showing the drive sprocket engaging the chain;

FIG. 2 is a plan view of an assembled section of a flight conveyor chain with two flights attached;

FIG. 3 is a side view of a section of a conveyor chain;

DETAILED DESCRIPTION OF THE PREFERRED EMBODIMENTS

Figure 4:
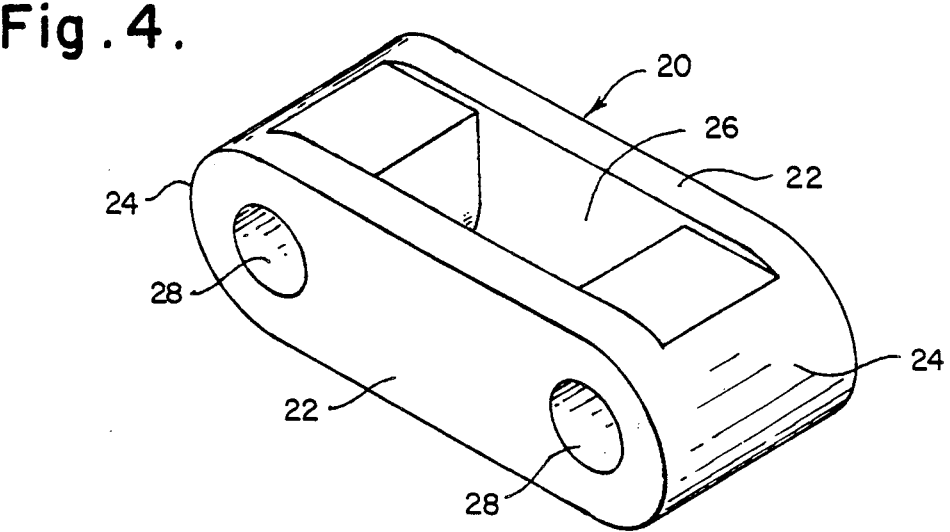
FIG. 4 is a perspective view of a block or roller link.

Referring now to the drawings wherein the showings are for purposes of illustrating the present preferred embodiments of the invention only and not for purposes of limiting same, the figures show a chain and flight conveyor assembly, generally designated as 10.

More particularly and with reference to FIG. 1, there is shown a conveyor chain 10 which may ride along a conveying deck 12 of, for example, a shuttle car. As shown in FIG. 2, the conveyor chains 10 consist of two (2) drive chains 14 which are positioned on the extreme outer borders of the conveying deck 12 of the shuttle car and are connected by flights 16. Flights 16 ride along the deck 12 to sweep mined material therealong. A drive sprocket 18 of the shuttle car drivingly engages each drive chain 14 at each link thereof as described hereinbelow.

Each drive chain 14 includes a plurality of links 20. As shown in FIG. 4, links 20 are preferably provided in the forms of roller links or, more preferably, block links which are unitary links having spaced longitudinal side members 22 and spaced lateral cross members 24 which define an open area 26. As such, block links 20 may be engaged by a sprocket 18 on the outer surfaces of the lateral cross members 24 as well as in the open area 26. The cross members 24 are additionally provided with lateral bores 28. As shown in FIG. 2, in the drive chains 14, the block links 20 are interconnected by outer side plates 30 and inner side plates 32 by means of journal pins 34 which are retained by retaining rings 36.

Figure 5:
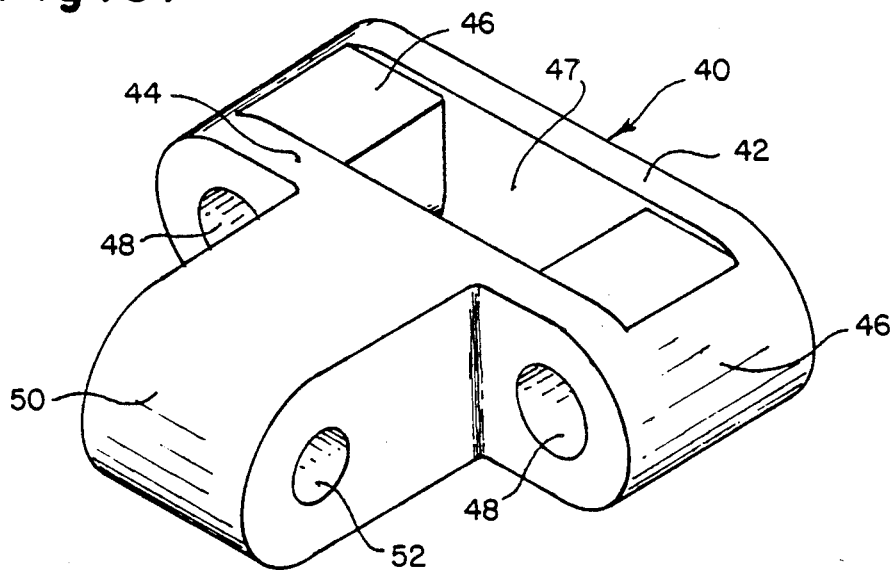
FIG. 5 is a perspective view of a roller or block link according to the present invention with the extending male member.

At predetermined intervals along the length of each of the chains 14, the block links 20 are replaced by flight attachment links 40 to which the flights 16 are attached. For example, preferably every third block link 20 along each chain 14 is replaced with a flight attachment link 40. As shown in FIG. 5, flight attachment links 40 each include an outer side member 42, inner side member 44 and lateral cross member 46 thereby defining an open space 47. Such open spaces 47 may also be drivingly engaged by the sprocket 18. Lateral bores 48 are provided in cross members 46. In addition, laterally inwardly (as taken toward the opposite chain 14) extended male attachment members 50 are provided on each inner side member 44 of flight attachment links 40. A bore 52 is provided in attachment member 50 and extends parallel to the length of chain 14.

Figure 6:
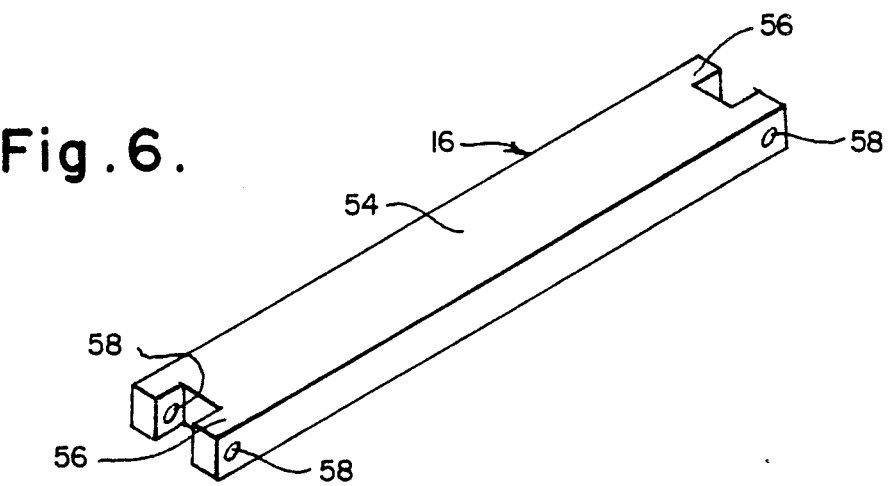
FIG. 6 is a perspective view of a flight with female ends.
Figure 7:
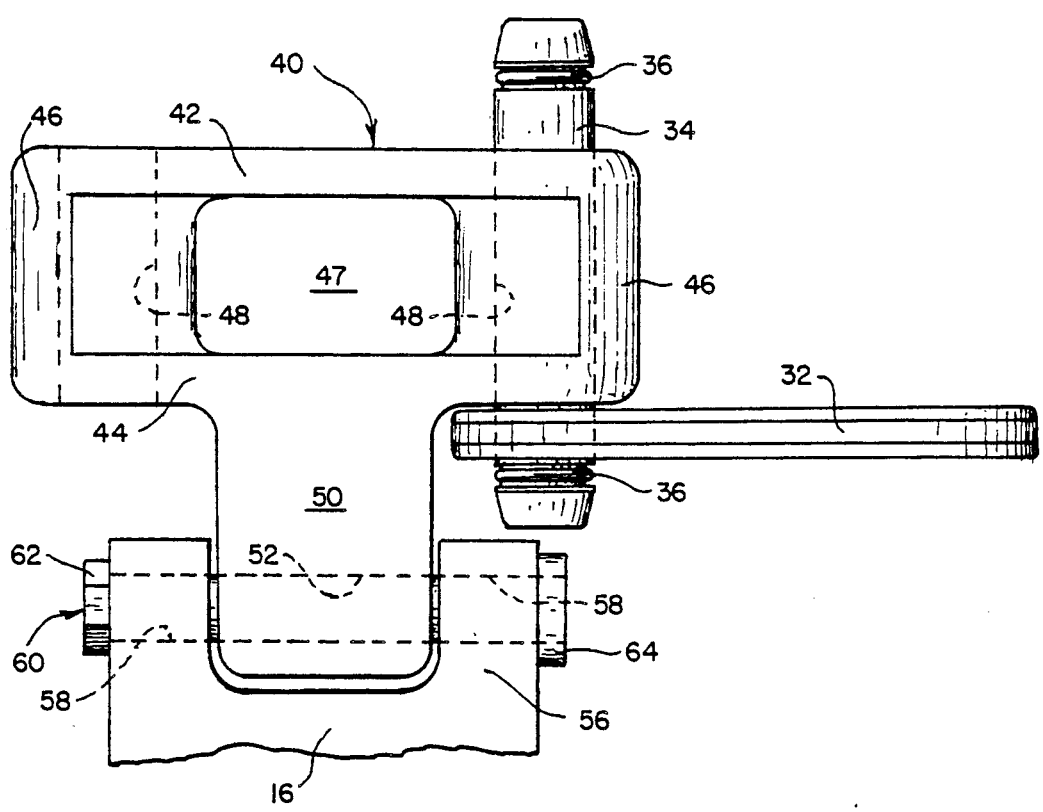
FIG. 7 is a plan view with a partial cut away view of one unit of the assembled flight conveyor mechanism.

With reference to FIG. 6, there is shown a flight 16 which may comprise a solid element or, alternatively, may be of a welded tubular design. The flight 16 includes a bar member 54 having U-shaped female receptacles 56 on each end thereof. Aligned bores 58 are provided in the sides of each receptacle 56 and are parallel to the length of the chain 14. Each flight 16 is attached to a corresponding flight attachment link 40 on each chain 14. As shown in FIG. 7, such attachment is accomplished by means of fasteners 60, such as bolts 62 and nuts 64, passing through the bores 58 in the receptacle ends 56 of the flights 16 and through the bores 52 in the attachment members 50.

In the operation of the present invention, the conveyor chain-flight assembly 10 may be assembled as a unit or may be assembled as discrete chains 14 which are installed on a shuttle car with the flights 16 being installed later. Due to the attachment mechanism disclosed herein, the flights 16 may be installed or removed when the chains 14 are under tension from sprockets 18 and without disrupting either chain 14. Also, due to the designs of the block links 20 and flight attachment links 40, the sprocket 18 may engage each lateral link of the chains 14 thereby affording smoother, more reliable operation.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A chain and flight conveyor adapted to be driven by a toothed sprocket, comprising:
    a. a pair of spaced, parallel driving chains, each of said driving chains comprising:
        (1) first block links having at least one end surface which may be drivingly engaged by the teeth of said sprocket and having internal apertures defining drive surfaces which may be drivingly engaged by the teeth of said sprocket;
        (2) second links coupled to and interconnecting said first links; and
        (3) a predetermined corresponding number of said first block links on each of said chains comprising flight attachment block links having extension members facing the opposite chain, said extension members having a bore therethrough in the direction parallel to said driving chains; and
    b. a plurality of conveying flights connected between said corresponding number of said flight attachment block links, said flights comprising a bar member having U-shaped open ended receptacles provided on the ends thereof which are adapted to receive one of said extension members, the ends of said bar member including apertures aligned with the aperture in a corresponding extension member to receive a fastener therethrough.

2. Apparatus of claim 1 in which said fastener comprises a nut and bolt combination.

* * * * *